(12) United States Patent
Movert et al.

(10) Patent No.: US 11,919,512 B2
(45) Date of Patent: Mar. 5, 2024

(54) PATH PREDICTION FOR A VEHICLE

(71) Applicant: Volvo Car Corporation, Gothenburg (SE)

(72) Inventors: Anders Movert, Gothenburg (SE); Anders Ödblom, Bohus-Björkö (SE); Andrew Backhouse, Gothenburg (SE); Nasser Mohammadiha, Gothenburg (SE); Peter Hardå, Torslanda (SE)

(73) Assignee: VOLVO CAR CORPORATION, Gothenburg (SE)

( * ) Notice: Subject to any disclaimer, the term of this patent is extended or adjusted under 35 U.S.C. 154(b) by 393 days.

(21) Appl. No.: 16/212,780

(22) Filed: Dec. 7, 2018

(65) Prior Publication Data

US 2019/0179328 A1    Jun. 13, 2019

(30) Foreign Application Priority Data

Dec. 11, 2017    (EP) .................................... 17206456

(51) Int. Cl.
*B60W 30/095* (2012.01)
*B60W 50/00* (2006.01)
(Continued)

(52) U.S. Cl.
CPC ...... *B60W 30/0953* (2013.01); *B60W 30/095* (2013.01); *B60W 30/0956* (2013.01);
(Continued)

(58) Field of Classification Search
CPC .. G05D 1/0221; G05D 1/0212; G05D 1/0088; G05D 1/0248; G05D 1/0255;
(Continued)

(56) References Cited

U.S. PATENT DOCUMENTS 8,108,147 B1 * 1/2012 Blackburn ............. G08G 1/166
235/454
9,224,050 B2 * 12/2015 Elinas ..................... G06V 20/56
(Continued)

FOREIGN PATENT DOCUMENTS

| CN | 101633359 A | 1/2010 |
| CN | 101966846 A | 2/2011 |

(Continued)

OTHER PUBLICATIONS

"The Classification of Motion in Image Sequences Using 3D Recursive Adaptive Filters to Obtain Neural Network Input Vectors", Bruton et al. Jan. 1, 1995, 1995 IEEE Conference International Conference on Neural Networks, (Year: 1995).*
(Continued)

*Primary Examiner* — Jeffrey C Boomer
(74) *Attorney, Agent, or Firm* — Kilpatrick Townsend & Stockton LLP (57) ABSTRACT

A method and system for predicting a near future path for a vehicle. For predicting the near future path sensor data and vehicle driving data is collected. Road data is collected indicative of a roadway on the presently occupied road for the vehicle. The sensor data and the vehicle driving data is pre-processed to provide object data comprising a time series of previous positions, headings, and velocities of each of the objects relative the vehicle. The object data, the vehicle driving data, and the road data is processed in a deep neural network to predict the near future path for the vehicle. The invention also relates to a vehicle comprising the system.

12 Claims, 9 Drawing Sheets

(51) Int. Cl.
  *G05D 1/00* (2006.01)
  *G05D 1/02* (2020.01)
  *G06N 3/02* (2006.01)
  *G06N 5/022* (2023.01)

(52) U.S. Cl.
  CPC ....... *B60W 50/0097* (2013.01); *G05D 1/0212* (2013.01); *G06N 3/02* (2013.01); *G06N 5/022* (2013.01); *B60W 2050/0075* (2013.01); *B60W 2420/403* (2013.01); *B60W 2420/42* (2013.01); *B60W 2420/52* (2013.01); *B60W 2520/10* (2013.01); *B60W 2520/14* (2013.01); *B60W 2552/53* (2020.02); *B60W 2554/00* (2020.02); *B60W 2554/20* (2020.02); *B60W 2554/4029* (2020.02); *B60W 2554/4041* (2020.02); *B60W 2554/802* (2020.02); *B60W 2554/804* (2020.02); *B60W 2554/806* (2020.02); *B60W 2556/10* (2020.02); *G05D 1/0248* (2013.01); *G05D 1/0255* (2013.01); *G05D 1/0257* (2013.01); *G05D 2201/0213* (2013.01)

(58) Field of Classification Search
  CPC ........ G05D 1/0257; G05D 2201/0213; B60W 30/095; B60W 30/0953; B60W 30/0956; B60W 50/0097; B60W 2554/00; B60W 2050/0089; B60W 2520/14; B60W 2520/10; B60W 2420/42; B60W 40/04; B60W 40/06; B60W 40/10; B60W 40/105; G06N 3/02; G06N 5/022; G06N 3/0454; G06F 16/9537; G60F 16/29; G08G 1/0125
  See application file for complete search history.

(56) References Cited

U.S. PATENT DOCUMENTS

| | | | |
|---|---|---|---|
| 10,455,199 B1* | 10/2019 | Clemen, Jr. | G06T 7/70 |
| 2015/0211868 A1* | 7/2015 | Matsushita | G08G 1/166 |
| | | | 701/457 |
| 2015/0298621 A1* | 10/2015 | Katoh | G08G 1/165 |
| | | | 348/148 |
| 2016/0325753 A1 | 11/2016 | Stein et al. | |
| 2017/0132334 A1 | 5/2017 | Levinson et al. | |
| 2017/0249534 A1 | 8/2017 | Townsend et al. | |
| 2017/0267177 A1 | 9/2017 | Nariyambut Murali et al. | |
| 2018/0120843 A1* | 5/2018 | Berntorp | G05D 1/0212 |
| 2019/0009175 A1* | 1/2019 | Buxton | A63F 13/213 |
| 2019/0049987 A1* | 2/2019 | Djuric | G05D 1/0221 |
| 2019/0064815 A1* | 2/2019 | Haynes | G06K 9/6267 |
| 2019/0073524 A1* | 3/2019 | Yi | G06K 9/00771 |
| 2020/0031342 A1* | 1/2020 | Oguro | G06T 7/73 |

FOREIGN PATENT DOCUMENTS

| | | |
|---|---|---|
| CN | 105270383 A | 1/2016 |
| EP | 3219564 A1 | 9/2017 |
| WO | 2016156236 A1 | 10/2016 |
| WO | 2016183074 A1 | 11/2016 |

OTHER PUBLICATIONS

Additional References—Reporting letter from International Application No. 17206456.0.
Oct. 26, 2018 European Search Report issue on International Application No. EP17206456.
Office action and search report issued in the corresponding CN application No. 201811510142.7.

* cited by examiner

PATH PREDICTION FOR A VEHICLE

CROSS-REFERENCE TO RELATED APPLICATION

The present patent application/patent claims the benefit of priority of co-pending European Patent Application No. 17206456.0, filed on Dec. 11, 2017, and entitled "PATH PREDICTION FOR A VEHICLE," the contents of which are incorporated in full by reference herein.

FIELD OF THE INVENTION

The present invention relates to a system and a method for predicting the near future path for a vehicle. The present invention also relates to a vehicle comprising such a system.

BACKGROUND OF THE INVENTION

Advanced driver assist systems (ADAS) in vehicles range from cruise control and adaptive lighting to more advanced systems such as automatic braking, automatic steering to keep the vehicle in the right lane, or alerting the driver of the presence of other cars, etc. Generally, ADAS retrieve input data from multiple sources such as image processing from cameras, ultra sonic sensors, radar, or LiDAR. More recently, vehicle-to-vehicle connectivity, vehicle-to-infrastructure, and cloud based connectivity are arising as a promising addition to present ADAS.

Path prediction is an important component for advanced driver assistance systems for providing the vehicle with a safe and natural behavior in the traffic. Path prediction methods have to robustly take into account the available information relating to the vehicles present path and also to account for the un-predictable behavior of the other road users.

The two main machine learning paradigms for ADAS are end-to-end learning and modular system design. In end-to-end learning, one machine learning system will be used to control the vehicle by observing sensor data such as images from camera or data from a radar. In the modular system design, perception and control parts are isolated and the intermediate outputs from the perception are analyzed separately to get the required understanding of the environment which is then used in the decision and control modules to provide an input for the steering wheel and gas/brake pedals.

Although the above methods provide promising solutions for path prediction there is still room to improve the prediction accuracy of a predicted path.

SUMMARY

In view of above, it is an object of the present invention to provide improved prediction accuracy for advanced driver assist systems for vehicles, and/or autonomous drive system in vehicles.

According to a first aspect of the invention, there is provided a method for predicting a near future path for a vehicle, the method comprising: collecting vehicle driving data indicative of at least the velocity and the yaw rate of the vehicle, collecting sensor data indicative of the presence of objects in the vicinity of the vehicle, collecting road data indicative of a roadway on the presently occupied road for the vehicle, pre-processing the sensor data and the vehicle driving data to provide a set of object data comprising a time series of previous positions of the respective object relative the vehicle, a time series of the previous headings of the objects, and time series of previous velocities of each of the objects relative the vehicle, processing the object data, the vehicle driving data, and the road data in a deep neural network to predict the near future path for the vehicle based on the object data and the road data, and based on the processing in the deep neural network, providing a predicted path output.

The present invention is based on the realization that the path prediction accuracy may be improved by pre-processing the sensor data relating to objects near the vehicle, and vehicle driving data relating to the present vehicle, to provide a suitable representation of object data comprising a time series of previous positions and velocities of each of the objects relative the vehicle. This representation of the set of object data is input into a deep neural network adapted for image interpretation to predict the near future path for the vehicle.

The object position with respect to the vehicle should be understood to mean the spatial location of the object with respect to the vehicle, i.e. such that the distance from the object to the vehicle can be determined and also in which direction (e.g. heading, bearing, or front, rear, left right) from the vehicle the object is located. The position of an object may for example be a coordinate in a coordinate system where the vehicle's coordinates are known.

Furthermore, the object size may also be included in the object data. The object size is an indication of the space occupied by the object.

Vehicle driving data comprises at least data indicative of the velocity and the angular velocity (e.g. "yaw rate") of the vehicle. Vehicle driving data may further comprise data indicative of the acceleration, pitch rate, roll rate, etc., of the vehicle. A pitch motion of the vehicle is a rotation of the vehicle body around a transverse axis parallel with a side-to-side axis through the vehicle. A roll motion is a rotation of the vehicle around a longitudinal axis parallel with a front-to-rear axis through the vehicle.

In some possible implementations the deep neural network may be a multi-layer convolutional neural network comprising optional recurrent or recursive layers to improve the prediction accuracy of the path prediction. The deep neural network may also improve the consistency of the path prediction.

In the deep neural network, the object data, the vehicle driving data and the road data may be passed through fully connected layers to provide low dimensional object data representations, low dimensional vehicle driving data, and low dimensional road data representations. The low dimensional data representations may be processed though additional convolutional (or recursive or recurrent) layers to predict the near future path. A low dimensional representation of data is a representation of the data given by a reduced number of dimensions. For example, if the original data is given in a 1000-dimensional vector, the low dimensional representation of that data may be e.g. a 10-dimensional vector.

Pre-processing may include using machine learning or computer vision methods to identify the objects from the sensor data. Such machine learning methods or computer vision methods are per se known to the skilled person. Briefly, machine learning or computer vision methods and statistical signal processing are used to locate the objects in the vicinity of the vehicle and estimate their distance to the vehicle and also their speed. Outputs sensor data from different sensors can be fused by sensor fusions methods known to the skilled person to output the final object data.

The road data provides information about the roadway of the road. For example, sensor data may be analyzed to detect lane markings on the road, or to detect the road edges. Alternatively or additionally, road data may be provided from map information. Road edges and lane markings may primarily be detected by processing camera or lidar signals in the pre-processing step, or in a separate processing step using e.g. machine learning or computer vision methods and statistical signal processing, per se known to the skilled person.

The roadway may be a part of the road between lane markings or road edges of the road. The roadway is thus the part of the road on which it is suitable for the vehicle to drive.

The near future path should be interpreted as meaning the path during the near upcoming seconds for the vehicle. Thus, the predicted near future path includes the predicted path during the following e.g. 1, 2, 3, 4, or 5 seconds. A path should be understood as meaning any one of, or a combination of a longitudinal path, lateral path, and/or a height path.

The object data further comprises the heading (e.g. the "orientation") of the objects with respect to the vehicle. Additionally, the object data may further comprise the angular velocity ("yaw rate") of the objects with respect to the vehicle.

The representation of the set of object data may be provided by forming a matrix of the object data, the vehicle driving data, and the road data, as part of the pre-processing. The matrix comprises the time series of previous positions of the respective object relative the vehicle, the time series of the previous headings of the objects, and the time series of previous velocities of each of the objects relative the vehicle, wherein the matrix is processed in the deep neural network. Thus, the matrix comprises matrix elements forming lists of object data for a time series. Fore example, the matrix may be a 2-dimensional matrix of object data for one object. The matrix may thus comprise a time series of previous velocities with respect to the vehicle, a time series of previous positions with respect to the vehicle, and a time series of object headings. When there are several objects detected in the vicinity of the vehicle, one 2-dimensional matrix for each object may be provided or the object data for several objects may be included in a single 2-dimensional matrix, or a 3-dimensional matrix comprising the object data for more than one object may be provided.

Accordingly, the sensor data combined with the vehicle driving data may be restructured into a matrix where each column is a separate input and may according to some embodiments consist of the last e.g. 0-5 seconds of that input.

In some possible implementations, the representation of the set of object data may be provided by forming a graphical representation of the object data as part of the pre-processing, the graphical representation comprising a time series of images each indicative of a previous position of the respective object relative the vehicle, and a previous heading of the respective object, wherein the time series of images are processed in the deep neural network.

Data transformations may be used to transfer sensor data, vehicle driving data, and road data into a graphical representation of the scene comprising the vehicle and the surrounding objects. The graphical representation is advantageously insensitive to changes in object identification numbers. Further time series of previous positions and velocities of the objects are included into the graphical representation by different means. The time series may for example be included as a sequence of images, or the time series may be overlaid into a common graphical representation of the present scene and the scene history.

Further, a graphical representation based on the object data and the vehicle driving data may comprise an image indicative of a previous position of the respective object relative the vehicle, and a previous heading of the respective object, wherein the image is processed in the deep neural network. In other words, the previous positions and the previous headings may be overlaid with each other in a single image.

As an example, the object data and other scene data can be used to form a bird-eye view image of the surroundings that can be processed with the deep neural network to predict the vehicle path. Using a graphical representation advantageously enables the use of a convolutional neural network to predict the path.

Convolutional neural networks are particularly advantageous for analyzing images since spatial correlation is used effectively in convolutional neural networks and since the weights or connections between nodes are shared between connections from the input to the output nodes of a convolutional neural network. Therefore the number of required unknown parameters to be learnt by the deep neural network using given training data is fewer and it is therefore affordable to process high dimensional inputs such as images. In addition, recurrent neural network is employed in the inventive concept to provide the time aspect of the predicted path.

In some embodiments, pre-processing may comprise forming a graph based on the object data and the vehicle driving data, the graph comprising the previous object positions and a velocity profile, wherein the graph is processed in the deep neural network.

In some embodiments, it is included to collect map data indicative of a road environment and legal road characteristics, and processing the map data in the deep neural network to predict the near future path. The road environment may include the locations of the crossings, exits/entrances to the highways, number of lanes. Legal road characteristics may include speed limits and other road regulations. The legal road characteristics may be collected from a global positioning system or other means installed in the vehicle of establishing the position on the road and the legal road characteristics at that position.

In embodiments it may be included to collect destination data indicative of an intended future destination for the vehicle, and to process the destination data in the deep neural network to predict the near future path. Destination data may be how the vehicle should be driven in a road environment. For example, when approaching a roundabout, the preferred near future destination is a certain path in the round-about. Further, when approaching a highway exit, the preferred near future destination may be to a path off the highway, or a path to stay on the highway. A further example is that the destination data may be how to drive though a crossing, e.g. turn or go straight.

It may also be included in the method to collect traffic information indicative of deviations in the upcoming road resulting from intervention on the road, collecting position data indicative of the vehicle position, and processing the traffic information in the deep neural network to predict the near future path. Traffic information may relate to the precedence and location of accidents or construction works, etc. Traffic information may be collected via traffic information provider.

The deep neural network may be trained by supervised learning based on target values and paths recorded from human drivers in traffic or from automated drivers in traffic. The target values may be based on the paths taken by expert drivers, i.e. drivers driving the vehicle in paths which are considered at least close to optimal and therefore the target for the path prediction network in the deep neural network. During supervised training the deep neural network is trained by comparing the path taken by the vehicle based on the predicted paths with the target values. The training can be performed using for example backpropagation methods which are known per se to the skilled person. Pre-processing methods such as normalization and regularization techniques may be used to further improve the accuracy of the predicted path. Supervised learning may be understood as an imitation learning or behavioral cloning where the target values are taken from demonstrations of preferred behavior (i.e. driving paths in driving situations) and the deep neural network learns to behave as the demonstrations. Further example types of a neural network may be generative and adversarial network. Generally, a generative adversarial network comprises a discriminator and a generator, both may be provided in the form of a neural network. The discriminator has to undergo training, i.e. unsupervised training based on training data. It is the discriminator that will perform the mapping of driving behavior data with a driver model once it has been trained. The discriminator may be operated by a vehicle control unit. The generator is configured to provide noise influenced data samples (i.e. "fake samples") from a latent space to the discriminator. The discriminator is trained to distinguish between the real samples (i.e. present driving behavior data) and the fake samples. During training it is checked whether the discriminator was correct in its determination, and the training is fine tuned based on the outcome of the discriminators decision. Optimization in the generative adversarial network may be towards an global expected reward.

According to embodiments of the invention, the deep neural network may be trained by un-supervised learning based on a definition of safe and natural driving. For the unsupervised learning, a reinforcement learning method may be implemented using a proposed definition of safe and natural driving. The definition may include lane placement, distance to other vehicles, smoothness of driver inputs such as steering angle, accelerator pedal input and brake input, and predicting and avoiding dangerous situations such as vehicle approaching intersections in too high speed. Generally, unsupervised learning is achieved by letting the deep neural network interact with the environment, in this case in a driving situation, where a reward function is provided in order to judge the suitability of decisions taken by the deep neural network.

The deep neural network may be further trained online by analyzing the target values and paths recorded during operation of the vehicle during normal use of the vehicle. Further, the online training may comprise to record corrective actions performed by a human driver to correct the actual path taken by the vehicle. Accordingly, processing circuitry may be available to collect and store sensor data and possibly process it on-board or send the sensor data to a remote server (i.e. to the "Cloud") for processing by a deep neural network which has learned from data collected from a plurality of vehicles connected to the server.

The time series of data in the matrix may include position data and velocity data from the previous 0 to 1 second, 0 to 2 seconds, 0 to 3 seconds, 0 to 4 seconds, or 0 to 5 seconds.

The sensor data may be discarded when the sensor data has been pre-processed and the matrix of object data has been formed.

According to a second aspect of the invention, there is provided a system for predicting a near future path for a vehicle, the system comprises: an out-looking sensor unit for capturing sensor data indicative of the presence of objects in the vicinity of the vehicle, and for capturing road data indicative of a roadway on the presently occupied road for the vehicle, a vehicle sensor unit for collecting vehicle driving data indicative of at least the vehicle velocity and the vehicle yaw rate, and processing circuitry configured to: collect the road data from the out-looking sensor unit, pre-process the sensor data and the vehicle driving data to provide a set of object data comprising a time series of previous positions of the respective object relative the vehicle, a time series of the previous headings of the objects, and time series of previous velocities of each of the objects relative the vehicle, and process the object data and the road data in a deep neural network to predict the near future path for the vehicle.

The out-looking sensor may comprise an image capturing device, a radar, or a lidar, or a combination thereof. The out-looking sensing unit may be configured to capture sensor data indicative of objects present in the vicinity of the object in any direction from the vehicle. In other words, the out-looking sensor unit may advantageously have 360 degree coverage around the vehicle.

In some implementations, the out-looking sensor unit may be a forward-looking sensor unit having a field of view covering an area in front of the vehicle.

Furthermore, the out-looking sensor unit may be configured to acquire the road data and provide the road data to the processing circuitry.

According to embodiments of the invention, the system may comprise a map unit configured to provide map data indicative of a road environment and legal present road characteristics, wherein the map data is used by the processing circuitry in the deep learning to predict the near future path for the vehicle.

The pre-processing may be performed by a pre-processing module comprising several software components for manipulation of sensor data. These software components change data order, change data sampling, filter data, transform data into new variables and increase data combinations.

The sensor data may be arranged, and re-arranged, to suit the architecture of the deep neural network module. By multiple re-ordering of the sensor data, more input combinations are covered. Data down-sampling is used to allow for more complex deep neural network structures. Data filtering is used to smooth or enhance data characteristics. Data normalization is used to weigh error contributions. Data transformations may be used to transfer sensor data and road data into a graphical representation of the scene.

According to embodiments of the invention, the system may comprise a strategic path planning unit for providing destination data for the vehicle and a desired driving behavior in the road environments.

The processing circuitry may include a microprocessor, microcontroller, programmable digital signal processor or another programmable device. The processing circuitry may also, or instead, include an application specific integrated circuit, a programmable gate array or programmable array logic, a programmable logic device, or a digital signal processor. Where the processing circuitry includes a programmable device such as the microprocessor, microcontroller or programmable digital signal processor mentioned above, the processor may further include computer executable code that controls operation of the programmable device.

This second aspect of the invention provides similar advantages as discussed above in relation to the previous aspect of the invention.

According to a third aspect of the invention, there is provided a vehicle comprising the system according to the second aspect of the invention.

The vehicle may be an autonomous vehicle. In other embodiments the vehicle is a driver operated vehicle comprising the system.

This third aspect of the invention provides similar advantages as discussed above in relation to the above mentioned aspects of the invention.

According to a fourth aspect of the invention, there is provided a computer program product comprising a computer readable medium having stored thereon computer program means for predicting a near future path for a vehicle, wherein the computer program product comprises: code for pre-processing: collected sensor data indicative of the presence of objects in the vicinity of the vehicle, collected vehicle driving data indicative of at least the velocity and the yaw rate for the vehicle, and collected road data indicative of a roadway on the presently occupied road for the vehicle, to provide a set of object data comprising a time series of previous positions of the respective object relative the vehicle, a time series of the previous headings of the objects, and time series of previous velocities of each of the objects relative the vehicle, and code for processing the object data and the road data in a deep neural network to predict the near future path for the vehicle.

This fourth aspect of the invention provides similar advantages as discussed above in relation to the above mentioned aspects of the invention.

In summary, the present invention relates to a method and system for predicting a near future path for a vehicle. For predicting the near future path sensor data and vehicle driving data is collected and is indicative of the presence of objects in the vicinity of the vehicle. Road data is collected indicative of a roadway on the presently occupied road for the vehicle, and the sensor data is pre-processed to provide object data comprising a time series of previous positions, headings, and velocities of each of the objects relative the vehicle, The object data and the road data is processed in a deep neural network to predict the near future path for the vehicle. The invention also relates to a vehicle comprising the system.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing example embodiments of the invention, wherein.

DETAILED DESCRIPTION OF EXAMPLE EMBODIMENTS

In the present detailed description, various embodiments of the system and method according to the present invention are mainly described with reference to a vehicle in the form of a car. However, the present invention may equally be used with other vehicles such as trucks, buses, etc. Thus, this invention may be embodied in many different forms and should not be construed as limited to the embodiments set forth herein; rather, these embodiments are provided for thoroughness and completeness, and fully convey the scope of the invention to the skilled person. Like reference characters refer to like elements throughout.

Figure 1:
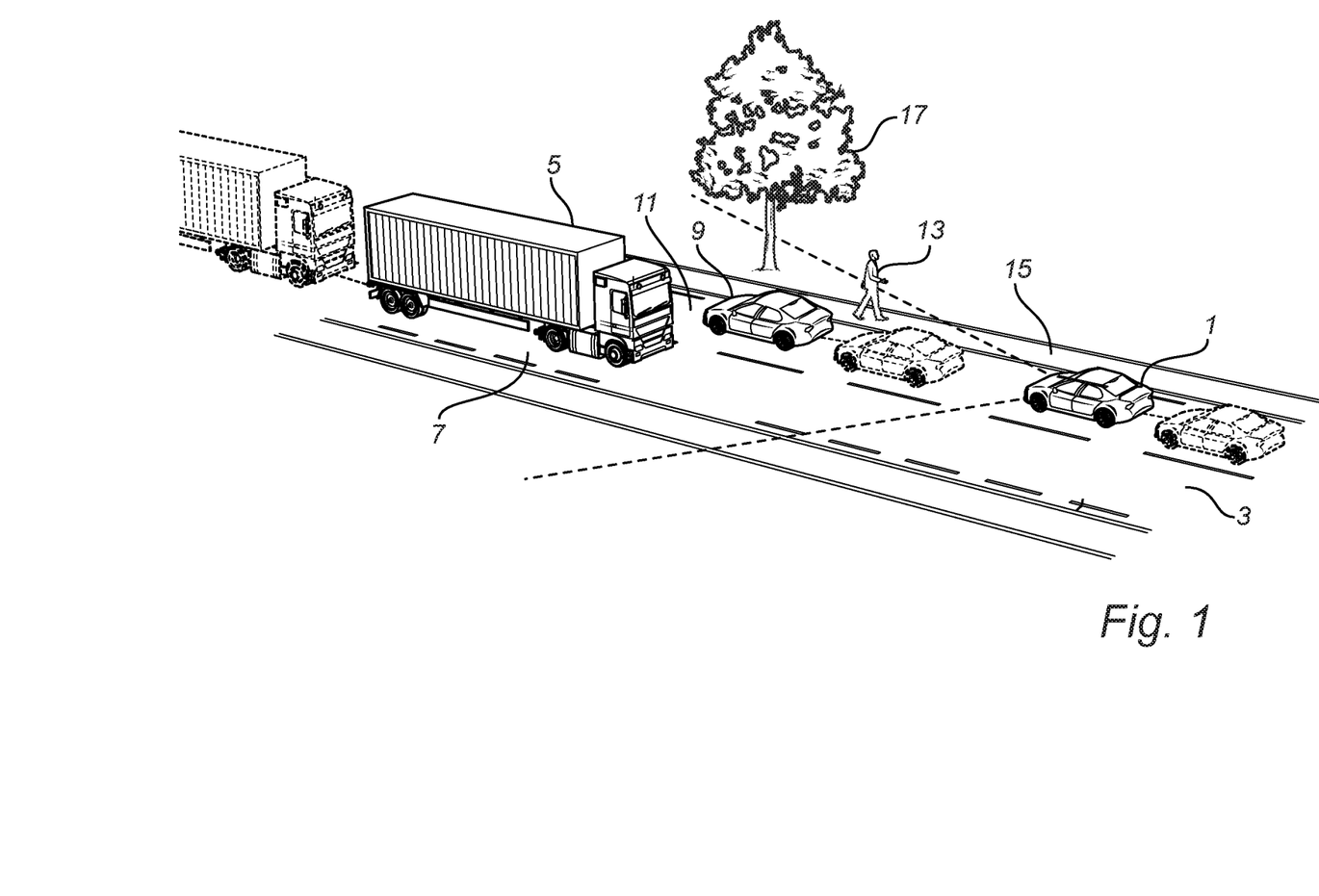
FIG. 1 conceptually illustrates application of embodiments of the invention.

FIG. 1 conceptually illustrates application of the invention. FIG. 1 shows a vehicle 1 driving on a road 3. The vehicle 1 has installed sensor unit(s) (not shown) such as radar, a LIDAR, and/or an image capturing device for obtaining sensor data indicative of the presence of object in the vicinity of the vehicle 1. The object may for example be an oncoming vehicle 5 approaching the vehicle 1 on the opposite lane 7, a vehicle 9 driving in front of the vehicle 1 in the same lane 11, a pedestrian 13 walking on a side walk 15 next to the road 3, or a tree 17 next to the road 3, to mention a few exemplary possible objects.

As the vehicle 1 is driving down the road 3, the sensors collect sensor data indicative of the presence of the objects 5, 9, 13, 17. The sensor data may be images from an image capturing device, e.g. a camera, or sensor data from a radar or Lidar. The vehicle 1 is further equipped with a vehicle sensor unit (not shown) comprising at least one of a gyroscope, an accelerometer, a speedometer, a steering torque sensor, etc. The vehicle sensor unit provides vehicle driving data indicative of the acceleration, pitch rate, roll rate, etc., of the vehicle 1. The vehicle driving data provides information about the motion of the vehicle whereas the sensor data provides information about the motions and positions of the surrounding objects. Together, the sensor data and the vehicle driving data enable an accurate understanding of the relationship between the vehicle and the surrounding objects.

The sensor data and the vehicle driving data is preprocessed in the vehicle 1 in order to obtain object data in the form of a list or a graphical representation of the surrounding objects 5, 9, 13, 17, and their statues. The preprocessing may include applying machine learning algorithms or computer vision methods to the sensor data for recognizing the objects and determining their statuses.

The list of object data for each of the surrounding objects 5, 9, 13, 17 comprises a time series of previous positions and previous velocities for each of the objects 5, 9, 13, 17 relative the vehicle 1. The object data further include the heading of the objects 5, 9, 13, 17 with respect to the vehicle 1 and in some possible implementations the angular rotation rate of the objects 5, 9, 13, 17 with respect to the vehicle 1. The time series may for example comprise positions, headings, and velocities from the previous 5 seconds with a resolution of e.g. 0.25 seconds.

Figure 2:
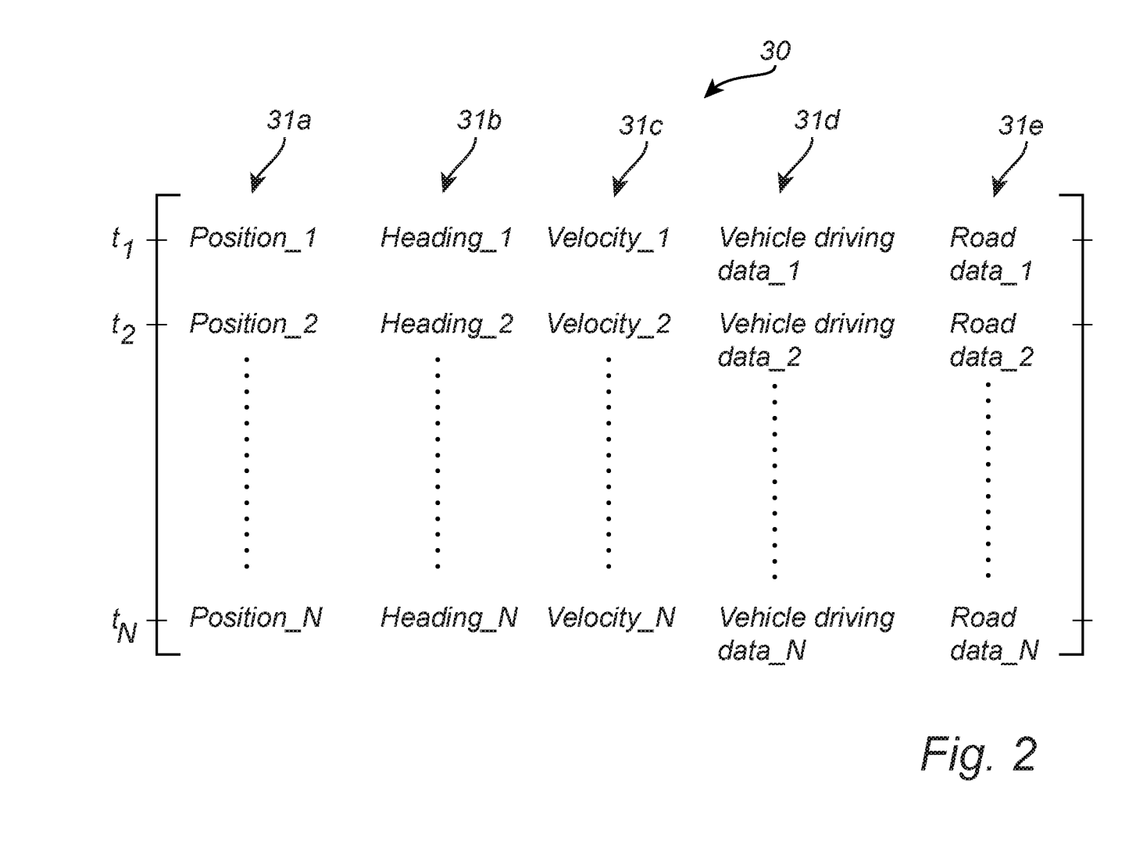
FIG. 2 conceptually shows a matrix of object data, vehicle driving data, and object data.

A conceptual view of a matrix 30 comprising lists 31a-e of object data is shown in FIG. 2. The list 31a (i.e. a column in the matrix) comprises the previous positions of the object for a time series $t_1$-$t_N$. The list 31b comprises the previous headings of the object for the time series $t_1$-$t_N$. The list 31c (i.e. a column in the matrix) comprises the previous velocities of the object for the time series $t_1$-$t_N$. The list 31d comprises previous vehicle driving data, and the list 31e comprises previous road data. The previous positions of the objects 5, 9, 13, 17 are schematically represented by the dashed lines in FIG. 1. The matrices, one for each of the objects 5, 9, 13, 17 are input into a deep neural network for predicting the near future path for the vehicle 1. The near future path may be the immediate future 0-5 seconds. In some implementations a single 2-dimensional matrix comprises the object data for all the identified objects. In further possible implementations the object data is included in a 3-dimensional matrix, i.e. as a stack of 2-dimensional matrices, one for each object.

Figure 3A:
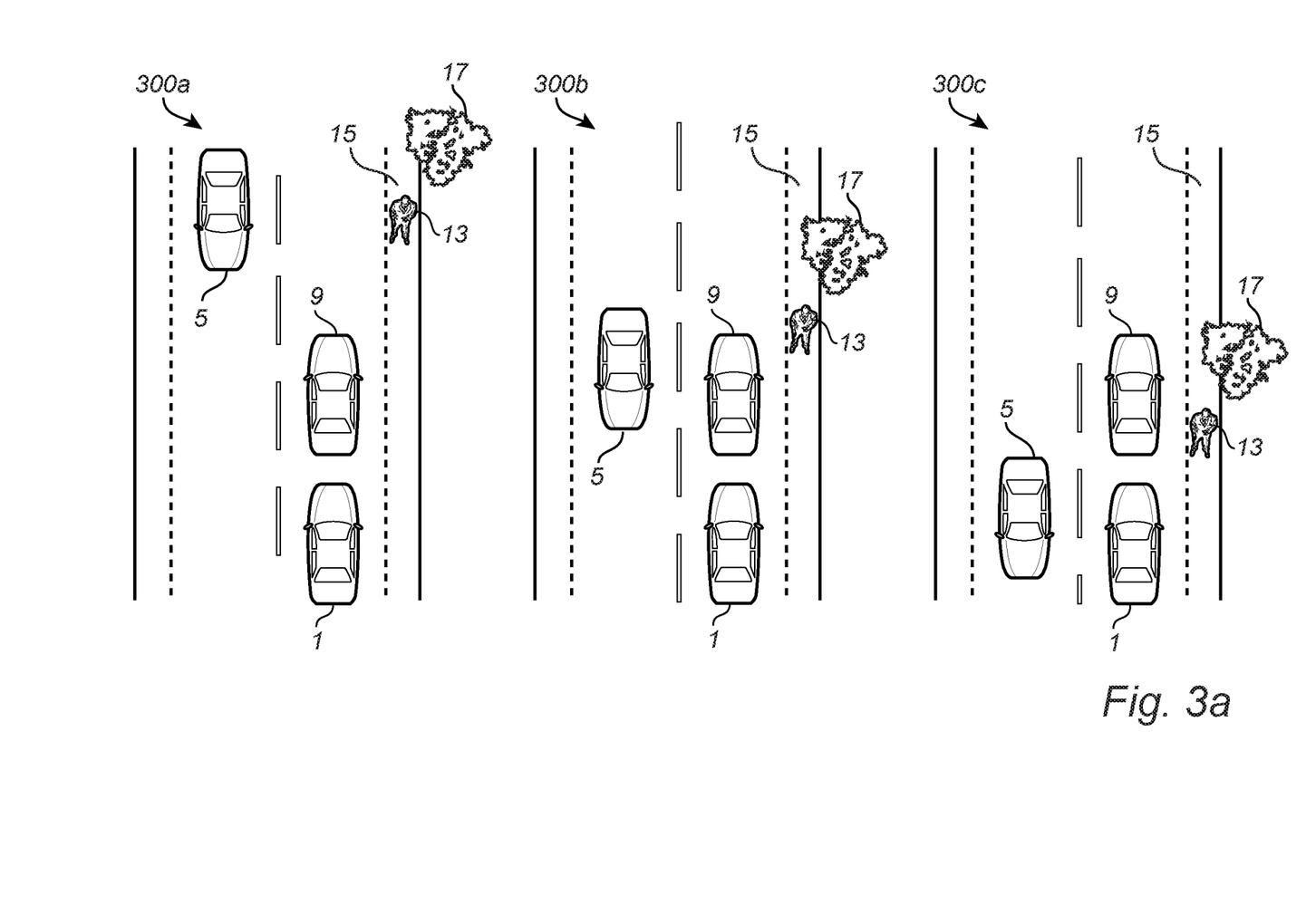
FIG. 3a conceptually shows an exemplary graphical representation.

FIG. 3a conceptually illustrates a representation of object data in the form of a graphical representation comprising a series of bird's eye views 300a-c of the vehicle 1 and the objects 5, 9, 13, 17. The bird's eye views thus together provide the time series of object locations and object velocities with respect to the vehicle 1. Also the object headings are provided by the graphical representations 300a-c. Using a graphical representation advantageously enables the use of a convolutional deep neural network in the prediction of the path. In some implementations using the series of bird's eye views 300a-c, a recurrent neural network may be used together with a convolutional deep neural network to improve the accuracy of the predicted path further.

In the first bird's eye view representation 300a collected sensor data has been pre-processed to provide an image (i.e. matrix of data) at a first instance in time. A second bird's eye view representation 300b is provided at a second time instance in the time series and a third bird's eye view representation 300c is provided at a third time instance in the time series. Thus, the series of graphical representations provides the time series of object data. The bird's eye views 300a-c are processed by a convolutional deep neural network to predict the near future path for the vehicle 1. Note that the time series of graphical representations is here only conceptually illustrated as comprising three bird eye views 300a-c.

In a real implementation, a relatively high number of bird eye views are needed and are more bird eye views are continuously created and provided to the deep neural network for continuous path prediction. Using graphical representations enables improved usage of image processing techniques such as convolutional deep neural networks for predicting the near future path.

Figure 3B:
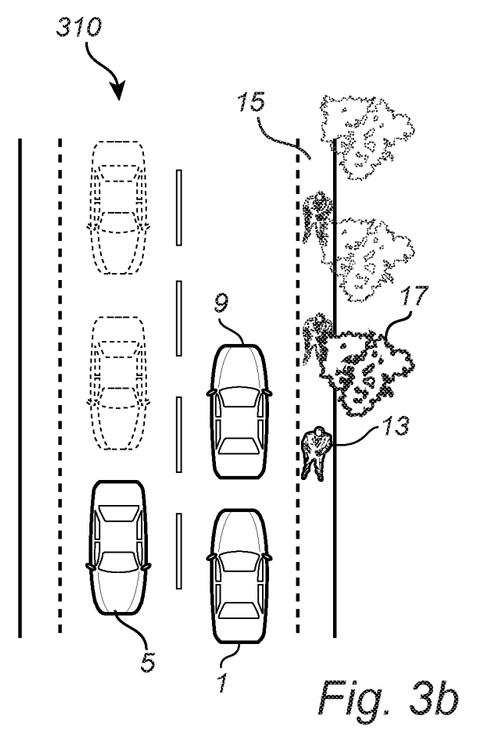
FIG. 3b conceptually shows an exemplary graphical representation.

FIG. 3b conceptually illustrates a representation of object data in the form of a graphical representation comprising a single image 310 based on object data and vehicle driving data. In the image 310, the previous positions and previous heading of the objects 5, 9, 13, 17 are indicated by dashed representations of the objects 5, 9, 13, 17. The single image 310 may also be provided as a bird's eye view. FIG. 3b only shows three time steps of previous positions and headings, however, the number of steps is only for exemplary purposes and in a real implementation, a relatively high number of time steps are used (e.g. hundreds or even thousands depending on the time resolutions).

Using a graphical representation which includes history data as shown in FIG. 3b advantageously enables the use of a convolutional deep neural network in the prediction of the path.

Figure 4:
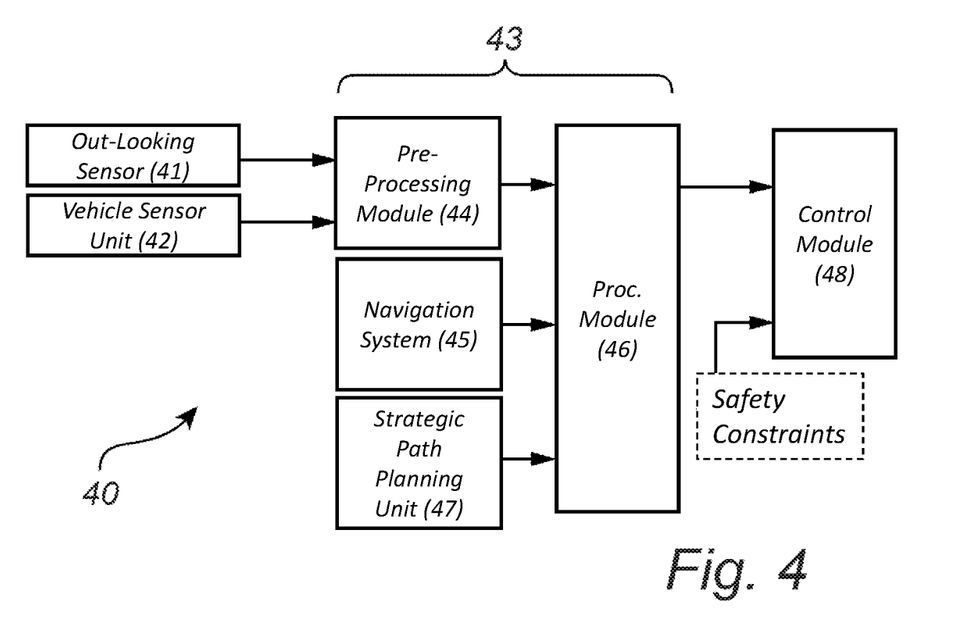
FIG. 4 schematically illustrates a system according to embodiments of the invention.

FIG. 4 conceptually illustrates a system 40 for predicting a near future path for a vehicle according to example embodiments of the invention. The system 40 comprises an out-looking sensor 41 comprising at least one of an image capturing device, a radar, or a Lidar, for obtaining sensor data indicative of the presence of objects in the vicinity of the vehicle. The sensor data from the sensor(s) 41 also include road data indicative of the roadway on the road where the vehicle is presently driving. The road information data may include the positions of road edges and lane markings with respect to the vehicle for determining the roadway.

Moreover, a vehicle sensor unit 42 is comprised in the system 40 and is configured to collect vehicle driving data indicative of at least the vehicle velocity and the vehicle yaw rate. A vehicle sensor unit 42 may comprise at least one of a gyroscope, an accelerometer, a speedometer, a steering torque sensor, etc. The vehicle sensor unit provides data indicative of the acceleration, pitch rate, roll rate, etc., of the vehicle.

The sensor data, the vehicle driving data, and the road data is input to processing circuitry 43 which may comprise a pre-processing module 44 and a processing module 46. The pre-processing module 44 may comprise software components for processing the sensor data, the vehicle driving data, and the road data. In the pre-processing module 44, the sensor data, vehicle driving data, and the road data is used by e.g. computer vision methods of machine learning algorithms for obtaining object data for each of identified objects. The object data comprise previous positions, previous headings, and previous velocities for the respective object for the previous e.g. 0-5 seconds. As new sensor data, vehicle driving data, and road data is collected, updated object data is generated. The object data may be provided in the form of one or more matrices or as a graphical representation comprising a series of images each indicative of a previous position of the respective object relative the vehicle, and a previous heading of the respective object.

The matrices of object data, or the graphical representation of the object data, the vehicle driving data, and the road data are input into the processing module 46 of the processing circuitry 43. The processing module 46 may comprise software components for executing a deep neural network for predicting the near future path for the vehicle based on the object data and the road data.

With further reference to FIG. 4, additional input to the deep neural network may include map information or destination data which may be input from a navigation system 45 such as one including a global position system and input from the driver regarding the destination. The map information provides additional information for the deep neural network such as the location of crossings, exist/entrances to the highways, speed limits, number of lanes, etc.

Additionally, the system 40 may comprise a strategic path planning unit 47 for providing destination data for the vehicle and a desired driving behavior in the road environments. The destination data may alternatively be provided by the navigation system 45.

Optionally, the predicted path is input into a control module 48 which may compare the predicted path to safety constraints for the vehicle before any action is taken based on the predicted path. The safety constraints may relate to limiting the steering angle and steering force for the vehicle such that the vehicle is not thrown off the road, limiting the maximum acceleration and movement in both the lateral and the longitudinal direction.

The proposed deep neural network may be a multi-layer convolutional neural network comprising optional recurrent or recursive layers to improve the prediction accuracy of the path prediction. The deep neural network may also improve the consistency of the path prediction. The object data which is input into the deep neural network comprise the last few seconds (i.e. 0-5 s) of that object data, i.e. that velocity, position, and heading of an object at sequential times instances (e.g. every 0.25 s) during the few seconds.

Figure 5:
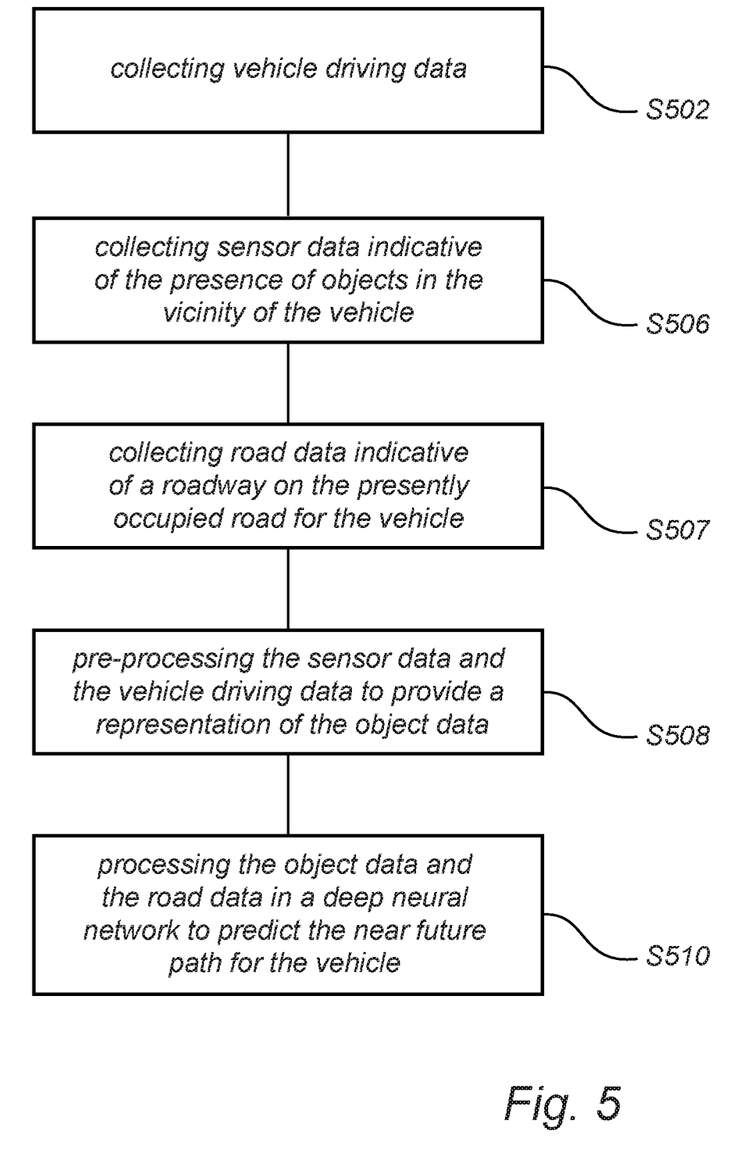
FIG. 5 is a flowchart of method steps according to embodiments of the invention.

FIG. 5 is a flowchart of steps according to embodiments. In a first step S502, vehicle driving data is collected indicative of at least the vehicle velocity and the vehicle yaw rate. Sensor data is collected in step S505 indicative of the presence of objects in the vicinity of the vehicle. Furthermore, road data is collected in step S506 indicative of a roadway on the presently occupied road for the vehicle. The sensor data and the vehicle driving data is pre-processed S508 to provide a representation of the object data. The object data may be provided in the form of one or more matrices or as a graphical representation comprising a series of images each indicative of a previous position of the respective object relative the vehicle, and a previous heading of the respective object. The matrices or graphical representations of object data and the road data is processed S510 in a deep neural network to predict the near future path for the vehicle.

Figure 6:
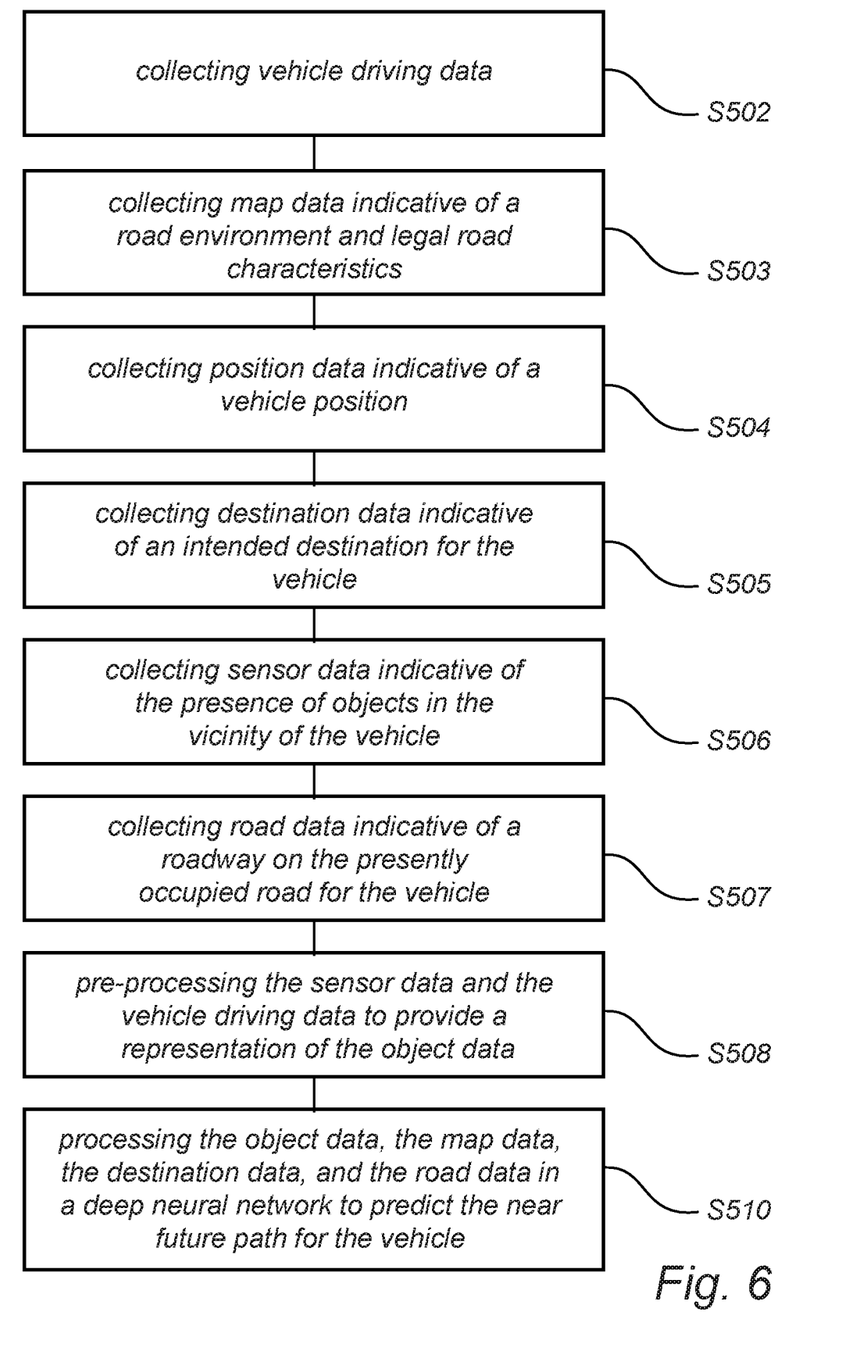
FIG. 6 is a flowchart of method steps according to embodiments of the invention.

FIG. 6 is a flowchart of steps according to embodiments of the inventive concept. In FIG. 6, the steps in FIG. 5 are included and an optional step of collecting (S503) map data indicative of a road environment and legal road characteristics. A further optionally step that is included in FIG. 6 is to collect (S504) destination data indicative of an intended destination for the vehicle. The destination data and the map data are subsequently used together with the object data and the road data in the deep neural network to predict the near future path in step S510.

Figure 7:
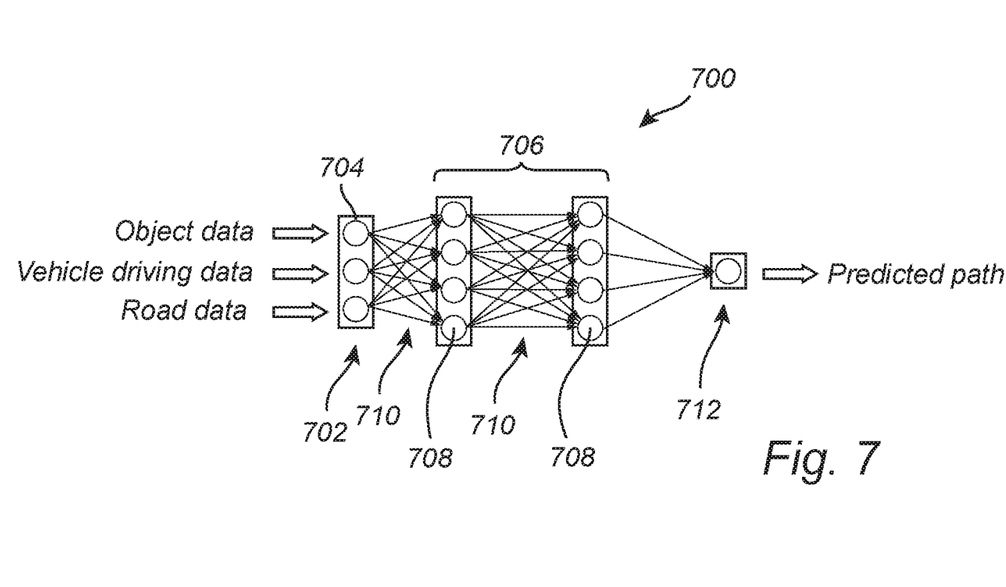
FIG. 7 schematically illustrates a methodology for determining a near future path.

FIG. 7 illustrates a possible approach of implementing a deep neural network for predicting a near future path. FIG. 7 specifically illustrates a block diagram of a feed forward deep neural network 700 used for predicting a near future path for a vehicle. The near future path may be predicted continuously or periodically during operation of the vehicle depending on the specific application.

The block diagram comprises an input layer 702, configured to receive input data to the deep neural network. The input data includes vehicle driving data, road data, and object data. The object data may be provided as matrix of data, a graphical representation (e.g. series of images, or as a single bird's eye view with overlapping historical data), or as a graph. The object data includes a time series of previous positions of the respective object relative the vehicle, a time series of the previous headings of the objects, and time series of previous velocities of each of the objects relative the vehicle. In other words, the object data includes historical data (in the past e.g. 1, 2, 3, 4, 5 seconds) for the objects. As mentioned, the object data is determined from pre-processing sensor data and the vehicle driving data. The input layer includes nodes 704 associated with each of the inputs.

The deep neural network 700 also includes one or more convolutional layers, and optional recurrent or recursive layers in block 706. A deep neural network based on recurrent layers take current data from the input layer 702 as an input in addition to previously processed data. In other words, recurrent layers are advantageously used for capturing the history of the input data.

Nodes 704 of the input layer 702 communicate with the nodes 708 of the layers 706 via connections 710. The connections 710 and weights of the connections are determined during training sessions, e.g. supervised or unsupervised training.

A predicated path is output in the output layer 712. The output predicted path may be provided in the form of polynomial coefficients of a curve fitted to the predicted path or just a down-sampled version of the predicted path.

It should be noted that the number of connections and nodes for each layer may vary, FIG. 7 is only provided as an example. Accordingly, in some deep neural network designs more than the indicated layers in FIG. 7 may be used.

Figure 8:
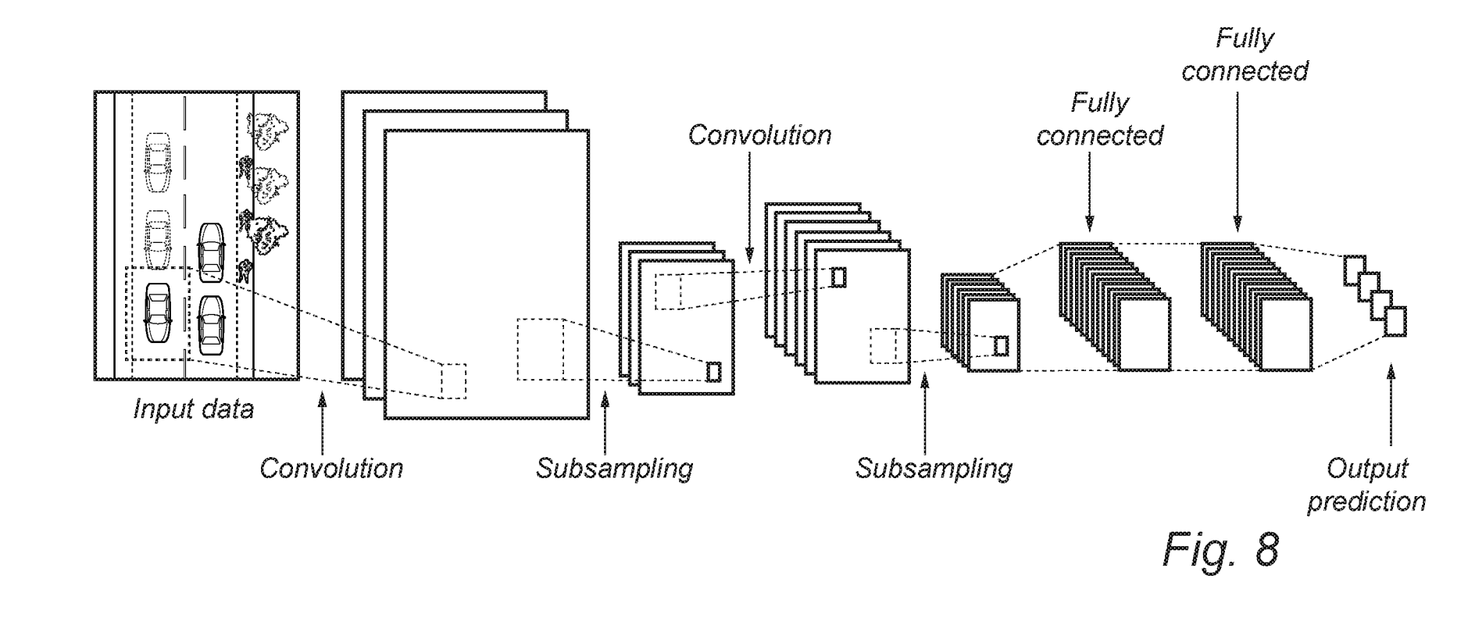
FIG. 8 schematically provides a further example deep neural network.

FIG. 8 conceptually illustrates a convolutional neural network in line for possible use with the inventive concept, for example combined with the illustrated neural network in FIG. 7. In a convolutional neural network, as is known to the skilled person, convolutions of the input layer are used to compute the output. Local connections are formed such that each part of the input layer is connected to a node in the output. Each layer applies filters whereby the parameters of the filters are learned during training phases for the neural network.

The control functionality of the present disclosure may be implemented using existing computer processors, or by a special purpose computer processor for an appropriate system, incorporated for this or another purpose, or by a hardwire system. Embodiments within the scope of the present disclosure include program products comprising machine-readable medium for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a sequence the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

The person skilled in the art realizes that the present invention by no means is limited to the preferred embodiments described above. On the contrary, many modifications and variations are possible within the scope of the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. Any reference signs in the claims should not be construed as limiting the scope.

The invention claimed is:

1. A method for predicting a future path for a vehicle, the method comprising:
    collecting vehicle driving data indicative of at least a velocity, an acceleration, and a yaw rate of the vehicle using a vehicle sensor unit of the vehicle;
    collecting sensor data indicative of a presence of an object in a vicinity of the vehicle using an out-looking sensor unit of the vehicle;
    collecting road data indicative of a roadway on a presently occupied road for the vehicle using the out-looking sensor unit of the vehicle;
    using pre-processing instructions stored in a memory and executed by processing circuitry, pre-processing comprising using data transformations of the sensor data, the road data, and the vehicle driving data to provide a graphical representation of a scene comprising the vehicle and surrounding objects, the graphical representation comprising a single image that provides a set of object data comprising a time series of previous positions of the object relative to the vehicle, a time series of previous headings of the object, and object size data indicating a space occupied by the object, and wherein the single image includes a bird's eye view of the scene comprising the vehicle and surroundings in the vicinity of the vehicle and the object;
    using processing instructions stored in the memory and executed by the processing circuitry, processing the single image of the graphical representation in a deep neural network to output a predicted future path for the vehicle based on the graphical representation; and
    controlling a motion of the vehicle using a vehicle control system comprising one of a driver assistance system and an autonomous driving system based on the predicted future path output.

2. The method according to claim 1, wherein the pre-processing comprises:
    forming a graph based on the object data, the vehicle driving data, and the road data, the graph comprising previous object positions and an object velocity profile, wherein the graph is processed in the deep neural network.

3. The method according to claim 1, further comprising:
    collecting map data from a map of a road environment, the map data indicative of a physical road environment and legal road characteristics comprising road regulations;
    collecting position data indicative of the vehicle position; and
    processing the map data in the deep neural network to predict the future path.

4. The method according to claim 1, further comprising:
    collecting destination data indicative of an intended destination for the vehicle; and
    processing the destination data in the deep neural network to predict the future path.

5. The method according to claim 1, wherein the deep neural network is trained by supervised learning based on target values and paths recorded from human drivers in traffic or from automated drivers in traffic.

6. The method according to claim 1, wherein the deep neural network is trained for safe driving by un-supervised learning.

7. The method according to claim 1, wherein the deep neural network is trained by analyzing target values and paths recorded during operation of the vehicle.

8. The method according to claim 1, wherein the time series includes object position data and object velocity data from the previous 0 to 1 second, 0 to 2 seconds, 0 to 3 seconds, 0 to 4 seconds, or 0 to 5 seconds from the present time.

9. A system for predicting a future path for a vehicle, the system comprising:
    an out-looking sensor unit for capturing sensor data indicative of a presence of an object in a vicinity of the vehicle and for capturing road data indicative of a roadway on a presently occupied road for the vehicle;
    a vehicle sensor unit for collecting vehicle driving data indicative of at least a velocity, an acceleration, and a yaw rate of the vehicle;
    processing circuitry configured to:
        pre-process comprising using data transformations of the sensor data, the road data, and the vehicle driving data to provide a graphical representation of a scene comprising the vehicle and surrounding objects, the graphical representation comprising a single image that provides a set of object data comprising a time series of previous positions of the object relative to the vehicle, a time series of previous headings of the object, and object size data indicating a space occupied by the object, and wherein the single image includes a bird's eye view of the scene comprising the vehicle and surroundings in the vicinity of the vehicle and the object; and
        process the single image of the graphical representation in a deep neural network to output a predicted future path for the vehicle based on the graphical representation; and
    a vehicle control system comprising one of a driver assistance system and an autonomous driving system and comprising instructions stored in a first memory and executed by the processing circuitry for controlling a motion of the vehicle based on the predicted future path output.

10. The system according to claim 9, wherein the out-looking sensor unit is configured to capture sensor data indicative of the objects present in the vicinity of the vehicle in any direction from the vehicle, wherein the out-looking sensor unit comprises an image capturing device, a radar (radio detection and ranging sensor), a LIDAR (light detection and ranging sensor), an ultrasonic sensor, or a combination thereof.

11. The system according to claim 9, further comprising:
    a map unit comprising instructions stored in a second memory and executed by the processing circuitry for providing map data from a map of a road environment, the map data indicative of a physical road environment and legal road characteristics comprising road regulations, wherein the map data is used by the processing circuitry to predict the future path for the vehicle.

12. The system according to claim 9, further comprising:
a strategic path planning unit comprising instructions stored in a second memory and executed by the processing circuitry for providing destination data for the vehicle and a desired driving behavior in a road environment.

* * * * *